United States Patent [19]

Engel

[11] Patent Number: 4,471,217
[45] Date of Patent: Sep. 11, 1984

[54] OPTICAL SCANNING SYSTEM

[75] Inventor: Joseph C. Engel, Monroeville, Pa.

[73] Assignee: Westinghouse Electric Corp., Pittsburgh, Pa.

[21] Appl. No.: 44,617

[22] Filed: Jun. 1, 1979

[51] Int. Cl.³ .............................................. G06K 7/10
[52] U.S. Cl. .................................. 235/468; 235/454; 235/487; 235/494
[58] Field of Search ....................... 362/217, 293, 4, 5; 235/454, 468, 471, 487, 494

[56] References Cited

U.S. PATENT DOCUMENTS

| | | | |
|---|---|---|---|
| 2,975,285 | 3/1961 | Palmer | 235/468 |
| 3,163,758 | 12/1964 | Treacy | 235/468 |
| 3,663,752 | 5/1972 | Froschle | 235/471 |
| 3,801,775 | 4/1974 | Acker | 235/487 |
| 3,808,406 | 4/1974 | Oberg et al. | 235/487 |

Primary Examiner—Harold I. Pitts
Attorney, Agent, or Firm—M. P. Lynch

[57] ABSTRACT

An optical reading system employing a commercially available line scanning camera which is sensitive to the ink employed in preprinted document formats. The sensitivity of a line scan camera to the preprinted ink formats is minimized by employing an incandescent document illuminating source, a lens system for the line scan camera which is optimized for use in the near infrared region, and an infrared pass filter positioned between the line scan camera lens system and the document to filter the light reflected from the document.

1 Claim, 1 Drawing Figure

U.S. Patent Sep. 11, 1984 4,471,217
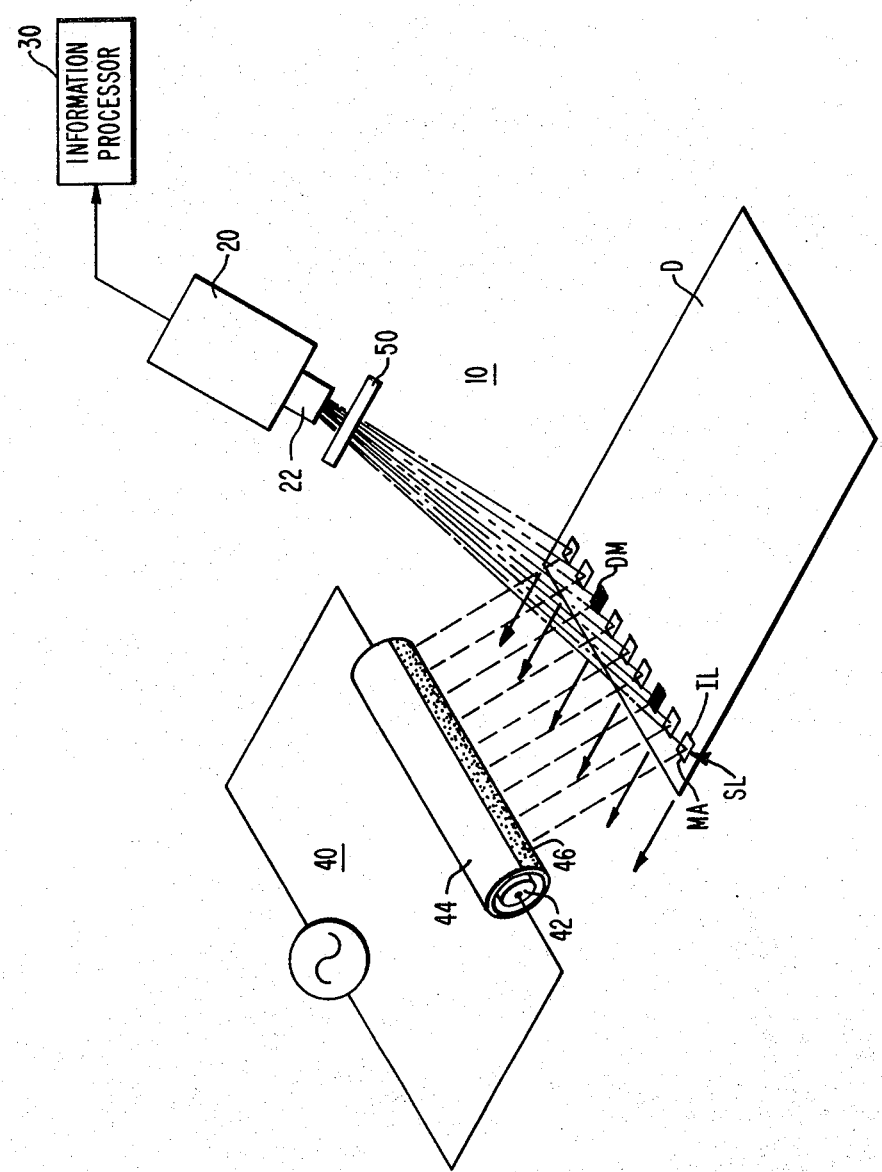

OPTICAL SCANNING SYSTEM

BACKGROUND OF THE INVENTION

Optical scanners and readers which are designed to read or to score marks, i.e., carbon pencil or ink, on a document commonly rely on the presence or absence of light reflection from the document as an indication of the presence or absence of a mark. Incident light directed onto a document from a light source is typically absorbed by a mark while light contacting the document in the absence of a mark produces a diffused source of reflected light. An optical reading or scanning system employing a line scanning camera including an array of light sensitive devices, i.e., phototransistors, photodiodes, charge-coupled devices, etc., responds to the reflected light and generates an electrical analog output signal which is indicative of the pattern of marks appearing on the document.

A widely-used application of the optical scanner or reader is in the scoring of student's test answer sheets and the totalizing of election ballots. In these applications of the optical scanner the document scanned consists of a preprinted form wherein predefined mark areas are printed with ink which outlines the mark areas within which a carbon pencil or ink mark is to be entered by a student or a voter. Unfortunately, the printing ink defining the mark areas also absorbs light. If, for example, the light source which illuminates the document contains no blue, a blue printed mark area will appear black inasmuch as the other colors present in the light source will be absorbed by the blue ink. A typical technique for avoiding the "ink noise" encountered in optical scanning systems is to use a light source which contains energy outside of the visible spectrum occupied by the various colors of ink which can range in color from violet to red, i.e., 350 to 750 nanometer wavelength.

Unfortunately, the camera lens of a commercially available line scan camera, such as Fairchild Model CCD1300, is normally optimized for use in the visible range. The application of this type of line scanning camera in an optical scanning system is described in detailed pending patent application Ser. No. 000,457, filed Jan. 2, 1979, entitled "Optical Reading System", assigned to assignee of the present invention, and incorporated herein by reference.

Typically, the commercially available line scanning cameras employ lens systems which have poor transmission characteristics and poor resolution for longer wavelengths. Experimental evaluations indicate that the inability of the commercially available camera lens to sharply focus in the near infrared can cause a 0.010 inch vertical line on a 8½ inch wide paper to appear as a 0.040 inch wide line when viewed through the lens from the image plane. This lens aberration can severely limit the resolution ability of an optical mark scanning or reading system employing a line scan camera.

SUMMARY OF THE INVENTION

It has been determined experimentally, as described below with reference to the accompanying drawing, that an optical mark scanning system employing a line scan camera having a lens system designed to be optimized for use in the near infrared (1,000 nanometer) when employed in combination with an infrared pass filter and an incandescent illuminating light source will provide near optimum system mark reading resolution.

DESCRIPTION OF THE DRAWING

The invention will become more readily apparent from the following exemplary description in connection with the accompanying drawing which is a block diagram schematic illustration of an embodiment of the invention.

DESCRIPTION OF THE PREFERRED EMBODIMENT

Referring to the drawing, there is schematically illustrated an optical reading system 10 including a line scan camera 20 for developing an analog output signal indicative of the mark information appearing on a line-by-line basis of the document D as it advances beneath the scan line field of view of the line scan camera 20. The analog information developed by the camera 20 in response to the presence or absence of marks on the successive scan lines of the document D is supplied to an information processor circuit 30 such as that described in the abovereferenced pending application.

The line scan field of view of the line scan camera 20 is illuminated by a linear light source 40 consisting of a tubular incandescent lamp 42 positioned within a tubular light reflective element 44 having a longitudinal light diffuser element 46 for concentrating the light emitted from the light source 40 onto the line of the document D corresponding to the scan line SL of the line scan camera 20. The linear light source 40, employing a commercially available inexpensive incandescent lamp in an embodiment similar to that illustrated in the drawing is described in detail in pending patent application Ser. No. 900,945, filed Apr. 28, 1978, entitled "Improved Linear Light Source", assigned to the assignee of the present invention and incorporated herein by reference.

The document D is illustrated as consisting of rows of predetermined mark areas MA defined as preprinted ink outlines IL. The format developed on a document on a basis of a pattern of ink outlines IL can represent a student's test answer sheet, a ballot, an inventory form, etc. The function of line scanning camera 20 in combination with information processor 30 is to distinguish between mark areas having a data mark DM and mark areas MA without data marks DM.

As described above, commercially available line scanning cameras, such as the Fairchild Model CCD1300, are unduly responsive to the ink outlines IL and this sensitivity diminishes the capability of the optical scanning system 10 to accurately distinguish between mark areas MA having data marks DM and mark areas MA without data marks DM.

It has been determined experimentally that this unsatisfactory sensitivity to ink outlines IL can be significantly reduced by employing a lens system 22 with the line scan camera 20 which is designed to be optimized for use in the near infrared, i.e., 1,000 nanometer, in combination with an infrared pass filter 50 and an incandescent illuminating light source 40.

While this improvement is most suitably implemented by positioning the infrared pass filter 50 between the document D and the camera 20 suitable results could be realized by positioning the filter 50 between the light source 40 and the document D.

I claim:

1. In an optical scanning system for extracting information on a line-by-line basis from a document in response to marks entered within ink outlined areas of a predefined document format, comprising, a line scan camera means for scanning on a line-by-line basis the predefined ink outlined areas of the document, a lens system associated with said line scan camera means exhibiting optimum sensitivity at approximately 1000 nanometers, an incandescent lamp illuminating source for illuminating the predefined outlined areas of said document being scanned by said line scan camera means, and an infrared pass filter means optically positioned between said lens system and said document to filter the light reflected from said document in response to said incandescent lamp illuminating means.

* * * * *